(12) United States Patent
Bestler et al.

(10) Patent No.: US 12,730,198 B2
(45) Date of Patent: Sep. 8, 2026

(54) ELECTRO-OPTIC TIME-OF-FLIGHT DISTANCE METER HAVING A RECEIVER CHAIN

(71) Applicant: HEXAGON INNOVATION HUB GMBH, Heerbrugg (CH)

(72) Inventors: Simon Bestler, Langenargen (DE); Marcel Rohner, Grub AR (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 771 days.

(21) Appl. No.: 18/103,268

(22) Filed: Jan. 30, 2023

(65) Prior Publication Data

US 2023/0243938 A1 Aug. 3, 2023

(30) Foreign Application Priority Data

Jan. 31, 2022 (EP) .................................... 22154389

(51) Int. Cl.
*G01S 7/4861* (2020.01)
*G01S 7/481* (2006.01)
(Continued)

(52) U.S. Cl.
CPC .......... *G01S 7/4861* (2013.01); *G01S 7/4816* (2013.01); *G01S 7/4865* (2013.01); *G01S 17/10* (2013.01)

(58) Field of Classification Search
CPC .... G01S 7/4861; G01S 7/4816; G01S 7/4865; G01S 17/10
See application file for complete search history.

(56) References Cited

U.S. PATENT DOCUMENTS 11,914,037 B2 * 2/2024 Kashmiri .............. G01S 7/4865
2012/0201100 A1 8/2012 Lyon
(Continued)

FOREIGN PATENT DOCUMENTS

CN 102621529 A 8/2012
CN 104508977 A 4/2015
(Continued)

OTHER PUBLICATIONS

Extended European Search Report dated Jul. 26, 2022 as received in Application No. 22154389.5.
(Continued)

*Primary Examiner* — Fernando Alcon
(74) *Attorney, Agent, or Firm* — Maschoff Brennan

(57) ABSTRACT

An electro-optic distance meter according to the time-of-flight principle with a receiver chain for generating a digital signal from a received light pulse, the receiver chain comprising a photodetector, a first gain stage, in particular a transimpedance amplifier or a current-mode electronic, for converting an input current from the photodetector associated to the returned light pulse into an output voltage, a filter and an analog-to-digital converter, whereby the digital signal provides an unambiguous relationship between intensity-time delay of the optical pulse and signalshape-time delay of the electrical signal, wherefore the photodetector, the first gain stage and the analog-to-digital converter are adapted to each other such that the analog-to-digital converter remains unclipped in a linear operating range even when the first gain stage shows a non-linear time-invariant response or a well-defined time-invariant saturation response to the input current of the photodetector.

18 Claims, 5 Drawing Sheets

(51) Int. Cl.
*G01S 7/4865* (2020.01)
*G01S 17/10* (2020.01)

(56) References Cited

U.S. PATENT DOCUMENTS

| | | | | |
|---|---|---|---|---|
| 2012/0257187 | A1 | 10/2012 | Stutz et al. | |
| 2013/0071109 | A1 | 3/2013 | Khatana et al. | |
| 2013/0135606 | A1 * | 5/2013 | Giacotto | G01C 3/08 356/5.01 |
| 2016/0349368 | A1 | 12/2016 | Stutz et al. | |
| 2018/0113160 | A1 * | 4/2018 | Warburton | G01S 17/10 |
| 2018/0356502 | A1 * | 12/2018 | Hinderling | G01S 7/4818 |
| 2019/0064323 | A1 * | 2/2019 | Mayer | G01S 7/4868 |
| 2020/0150209 | A1 * | 5/2020 | Kirillov | G01S 17/42 |
| 2020/0319318 | A1 * | 10/2020 | Weinberg | G01S 7/4866 |
| 2021/0063550 | A1 * | 3/2021 | Ramakrishnan | H03M 1/126 |
| 2021/0270965 | A1 * | 9/2021 | Liu | G01S 7/489 |
| 2022/0043149 | A1 * | 2/2022 | LaChapelle | G01S 7/484 |
| 2022/0317267 | A1 * | 10/2022 | Voicu | G01S 7/487 |
| 2023/0204734 | A1 * | 6/2023 | Sobel | G01S 7/489 356/4.01 |

FOREIGN PATENT DOCUMENTS

| | | | |
|---|---|---|---|
| DE | 102007021166 | A1 | 11/2008 |
| EP | 2597483 | A1 | 5/2013 |
| WO | 2020/205108 | A1 | 10/2020 |

OTHER PUBLICATIONS

CN Office Action dated May 28, 2025 as received in Application No. 202310072200.7.

Guo Ying, Chen Ben, Huang Genghua, Shu Rong; "Method of automatic gain control used in high precision pulse laser rangefinder"; Laser & Infrared, 04; Apr. 20, 2010.

Lei Fang, Deng Bingguang; "Design of laser receiver for photoelectric signal conversion"; Laser Journal, 07; Jul. 25, 2018.

* cited by examiner

ELECTRO-OPTIC TIME-OF-FLIGHT DISTANCE METER HAVING A RECEIVER CHAIN

BACKGROUND

The disclosure relates to an electro-optic distance meter according to the time of flight principle.

Various principles and methods for determining the desired distances are known in the field of optical and/or optoelectronic distance measurement. One approach is to emit pulsed electromagnetic radiation, for example, laser light, toward a target to be measured and subsequently to receive an echo from this target as the backscattering object, wherein the distance to the target to be measured can be determined on the basis of the propagation time of the pulse. Such pulsed time of flight distance meters (ToF, i.e., time-of-flight) have prevailed in many fields as standard solutions over time.

Two different approaches are used for detection of the returning pulse.

In the so-called threshold value method, a received light pulse is detected when the intensity of the radiation incident on a detector of the distance meter used after converting the optical signal to an electrical one with an APD (Avalanche Photo Diode) or a Pin-diode in combination with a TIA (Transimpedance Amplifier) or SPAD or SiPM which then exceeds a specific threshold value, wherein this is usually implemented with the aid of a comparator stage (i.e., a comparator). This threshold value prevents noise and interfering signals from the background or electronics from being detected incorrectly as a useful signal, i.e. as backscattered light of the emitted light pulse.

One disadvantage of the threshold value method is that, for example, in the event of weak backscattered pulses, as are caused, for example, by greater measurement distances or lower reflective targets, a detection is no longer possible if the pulse intensity falls below the detection threshold, i.e., below the threshold value.

A further disadvantage is either the complex structure and/or the lack of precision with respect to the time determination of the comparator signal (i.e., excessively low resolution) of many known time-to-digital converters (TDCs) typically used in the scope of the threshold value method. In addition, the so-called range walk (distance error/drift by varying amplitude) has to be corrected.

The other approach is based on the sampling of the backscattered converted pulses (WFD method, waveform digitization). A returning signal is thus detected in this case, the radiation acquired by a detector which is converted into an electrical signal using APD/Pin-diode with TIA or SPAD or SiPM which gets sampled with an ADC, the pulse is identified within the sampled range, and finally the location thereof is determined chronologically with higher precision. By using a sufficient number of sampled values and/or summation of the received signal which is synchronous with the emission rate or the coding sequence of the transmitted signal, a useful signal can also be identified under unfavorable circumstances, so that greater distances or background scenarios which are noisy or subject to interference can also be measured. Digital phase measurement is a subvariant of this measurement method.

The limited linear modulation range of the electronic receiver circuit is also problematic in this so-called waveform digitization method (WFD method). At close ranges, the signal can saturate the receiver, so that the shape of the received signal after conversion from optical to electrical signals is no longer correctly ascertained and the propagation time, round-trip delay time is determined with insufficient accuracy due to signal distortions.

A substantial disadvantage of measuring principles known to date and based on the pulse transit time/time of flight principle is therefore either the limitation of signal detection by a detection threshold or the saturation of the receiver electronics, in particular of the TIA.

Further disadvantages are the requirements regarding the technical components, such as, for example, large dynamic ranges, resulting from the wish to limit these influences.

In particular, known LIDAR distance meters such as used in laser scanners with an APD/PIN diode (linear detector) and a TIA in the receiving channel do not cope with the high dynamics of the received laser pulse. The high dynamic range of the received laser signal is in particular due to a large extent of measurement range and reflectivity of objects to be measured. An example is given in FIG. 5, depicting a laser scan generated with a laser scanner as known in the art. Therein, as marked by the circles, light pulses from highly reflective areas 100 such as the window or the rear light are out of the limits the receiving measurement chain can handle and cannot be measured, resulting in the measurement gaps (black "holes" as shown), not containing any (true or valid) distance information.

As a countermeasure, it is known in the art to provide different receiver chains which cover different signal dynamic ranges, for example one receiver chain configured for the threshold value method (strong returning signal) and one receiver chain for the sampling waveform digitization method (for weaker returning signal). However, the inadequate comparability of the differently determined distance values and the additional structural and computer expenditure to effectively provide two completely separate and different receiver chains resp. evaluation circuits for a distance meter is disadvantageous.

SUMMARY

The objective of the present disclosure is therefore to provide an improved electro-optic distance meter with a high dynamic range.

The objective of the present disclosure is therefore to provide an electro-optic distance meter with a high dynamic range with an improved receiver chain.

The present disclosure relates to an electro-optic distance meter according to the time-of-flight principle with a receiver chain for generating a digital signal from a received light pulse and an electronic processor for digital signal processing of the digital signal, wherein the digital signal processing comprises waveform digitization, signal reconstruction from sample point values, particularly a signal reconstruction based on signal interpolation, and determination of a time delay of the received light pulse.

The receiver chain comprises in this order a photodetector and a (first) gain stage, preferably a transimpedance amplifier or a current-mode electronic, for converting an input current from the photodetector associated to the returned light pulse into an analog output. The receiver chain can comprise one or more further gain stage downstream of the first gain stage.

The receiver chain further comprises a band pass or low-pass filter in between the (first) gain stage and an analog-to-digital converter (ADC) for converting the analog signal into a digital signal. Preferably, the filter is designed for limiting the signal bandwidth to the Nyquist frequency.

The photodetector, the gain stage and the analog-to-digital converter (ADC)—and if present any gain stage following the filter—are adapted to each other such that the ADC—and if present any gain stage following the filter—remains in a linear operating range even when the (first) gain stage shows a non-linear time-invariant response or a (well)-defined time-invariant saturation response to the input current of the photodetector and therewith to the received light pulse. Hence, even strong or intense laser pulses do only lead to a non-linear or saturated response of only the first gain stage whereas any further amplifying stage (if present), and in particular the ADC— or in short the receiver or signal chain following the filter—operates in its respective linear regime. Thereby results an unambiguous relationship of the pair of optical intensity and time delay of the optical pulse on the one hand and the pair of signal shape and time delay of the electrical signal on the other hand. This unambiguous relationship (optical intensity/time delay)— (electrical signal shape/time delay) can be exploited by appropriate signal processing.

The digital signal processing comprises optionally the steps of extracting at least one characteristic signal feature, tagging the extracted feature with a time stamp by means of signal interpolation and determining the time delay of the received light pulse—directly or indirectly—based on the according time stamp. As an example for indirectly using a time stamp, e.g. a signal amplitude at the time-stamp is evaluated for time-delay determination.

As a further option, the digital signal processing comprises applying digital linear operators to the digital signal before extracting a characteristic signal feature. Thereby, the digital linear operators optionally mimic constant fraction discriminators and/or they approximate first order derivatives and/or they are configured to eliminate signal offsets.

Preferably, said characteristic features are a zero-crossing of an m-th order derivative of the digital signal or of an output of said digital linear operators, in particular wherein m is 0, 1 or 2.

In a preferred embodiment, the digital processing comprises range walk correction. Preferably, the range walk correction applies an additive correction to an estimation of a pulse position by a first weighted sum based on said time stamps of extracted characteristic signal features. The additive correction is based on a second weighted sum based on said time stamps of extracted characteristic signal features. Like already mentioned above, the time stamps can be themselves serve for a weighted sum (direct basis) or amplitude or the like at a time stamp can be used for a weighted sum (indirect basis). In particular, the range walk correction is based on a difference of time stamps of two extracted characteristic features.

Besides time delay determination, as an option, the digital signal processing can comprise determining a pulse intensity based on the at least one characteristic signal feature, too.

Optionally, the electronic processor is configured to provide a distinction as to whether the receiver chain is in a first operation range with the first gain stage showing said non-linear time-invariant response resp. well-defined time-invariant saturation response—or in a second operation range with the complete amplifier/receiver chain being in a linear operation, including the first gain stage and possibly the photodetector. The distinction allows for an adaption of the signal processing in accordance thereto resp. for the digital signal processing to be further differentiated into two ways of digital signal processing, denoted first digital signal processing for the first operation range and second digital signal processing for the second operation range. The distinction is optionally based on a comparison of said signal characteristic with a defined threshold.

The present disclosure also relates to a method for electro-optic distance measuring wherein the distance is measured with an electro-optic distance meter.

The present disclosure provides advantageously an electro-optic distance meter which covers with only a single receiver chain a wide dynamic range. Evaluation of strong, saturating light pulses (e.g. for short distances or highly reflective targets) and determining a distance therefrom is enabled whilst evaluation of "normal" light pulses is possible, too, for instance using WFD (which is advantageous for improved resolution in time/measurement precision in the range of low to medium signal to noise ratio), and even weak light pulses (e.g. in the case of long measurement distances or objects of low reflectivity) do not vanish but are accessible for distance determination. Light pulses/digital signals can be accumulated/summed up and therewith even signals below noise threshold can be detected.

BRIEF DESCRIPTION OF THE DRAWINGS

The device and method will be described in greater detail hereafter, solely for exemplary purposes, on the basis of specific exemplary embodiments, which are schematically illustrated in the drawings, wherein further advantages will also be described.

In the figures.

DETAILED DESCRIPTION

Figure 1:
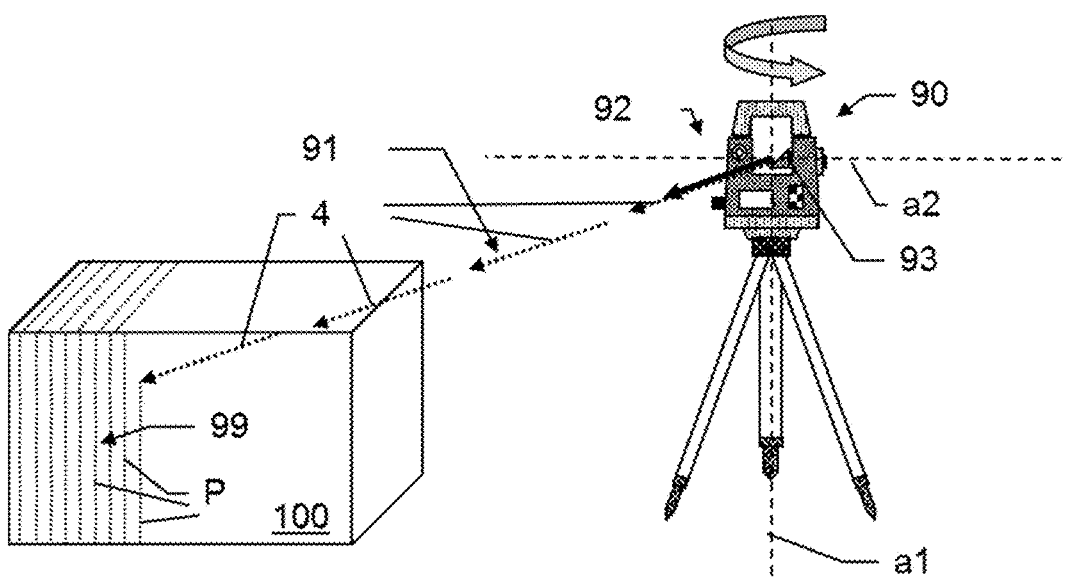
FIG. 1 shows a schematic illustration of a laser scanner with an optoelectronic distance meter of the type.

FIG. 1 shows a stationary measuring device 90 having an optoelectronic distance meter and in the example a scanning functionality for recording object surfaces 100, for example, the device 90 being embodied as a laser scanner. The device 90 has an intensity-modulated, in particular pulsed radiation source (not shown), for example, a laser source, and an optical unit (not shown), so that a pulsed measuring beam 91 can be emitted into free space onto a target object 100 in an emission direction. The individual pulses 4 are indicated by the individual dashed arrows. Typically today there is only 1 pulse in air, which means, that the pulse emission frequency is set that a subsequent pulse is fired when the present pulse is detected and propagated through the receiver. The emission direction defines a measuring axis and the respective present direction of the emission or the measuring axis is measured by one (if having a profiler) or at least two more (having a TPS, scanner, . . . ) position/angle detectors (not shown).

The optical unit is embodied, for example, as a combined emitting and receiving optical unit or has in each case a separate emitting optical unit and receiving optical unit. In this case, light pulses 4 reflected from the target object 100 are received by the measuring device 90 and acquired by a photodetector (not shown). In this case, for example, up to a million or more light pulses 4 per second and thus sampling points 99 can be acquired.

For the scanning sampling of the object 100, the measuring radiation 91 or emission direction is progressively pivoted and, in each case, at least one measured value per scanning point P is successively recorded at short time intervals, among them in any case a distance value to the respective scanning point P, so that a plurality of measurement directions associated with a respective scanning point P is provided and form a scanning grid from a plurality of scanning points P.

The pivoting is performed in this case by means of a beam deflector, as shown, for example, by an upper part 92 of the measuring device 90 being rotated step-by-step or continuously in relation to a base—relatively slowly—around a first, vertical axis a1, so that the measuring radiation 91 is pivoted in the horizontal and the plurality of emission directions differ from one another in the horizontal alignment, and in that a pivotable optical component 93, for example, a pivoting or rotating mirror, is rotated—relatively rapidly—about a horizontal axis a2, so that the measuring radiation 91 is pivoted in the vertical and the plurality of emission directions additionally differ from one another in the vertical alignment. The surface of object 100 is thus scanned line-by-line, for example, using a line grid as shown.

There are also implementations in which the vertical resolution is not implemented by an additional axis of rotation, but rather by multiple emitting and receiving units operating simultaneously, which have a specific constant angle offset in the vertical direction, for example, of 1°. The adjustment of the laser firing rate or the number of the measured points to be considered per scanning point is accordingly also possible here for each individual emitting-receiving unit as described here ("multibeam").

To measure the distance value Z, the measuring device 90 has an electronic processor (not shown), which comprises an analysis functionality for measuring the respective distance value Z according to the pulse propagation delay principle (analysis according to the time-of-flight method), based on a time delay of reflected and detected light pulse 4. Also, multiple received light pulses 4 can be used for determining of a distance value Z.

In addition to the distance value Z, for example, a brightness or intensity value can be recorded. The brightness is a grayscale value, which is determined, for example, by the amplitude, pulse width or pulse energy of the back reflected and received signal.

Figure 2A:
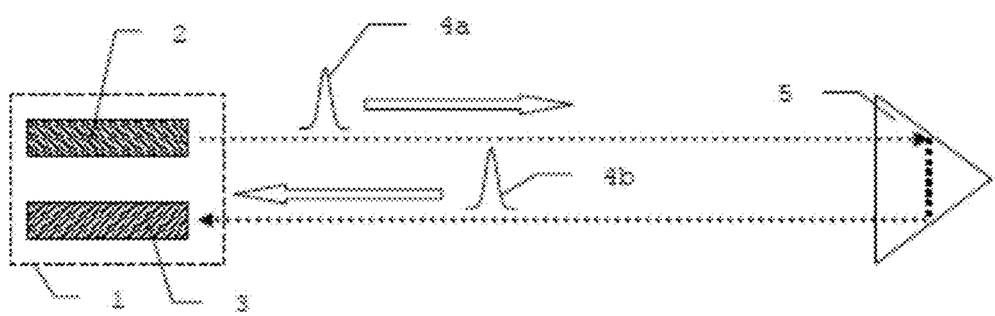
FIG. 2*a* shows a schematic illustration of an optoelectronic distance meter according to the prior art.

FIG. 2*a* shows a schematic illustration of an optoelectronic distance meter 1 of the prior art according to the pulse propagation delay principle. A transmitter 2 and a receiver 3 are arranged in the distance meter 1. The transmitter 2 emits a light pulse 4*a*, which is detected again by the receiver 3 after the reflection or backscattering on a target, for example a retroreflector 5, as the backscattered and received light pulse 4*b*. Instead of a single light pulse 4*a*, 4*b*, an analog or digital coded pulse sequence or a continuously modulated transmitted signal can also be used.

Figure 2B:
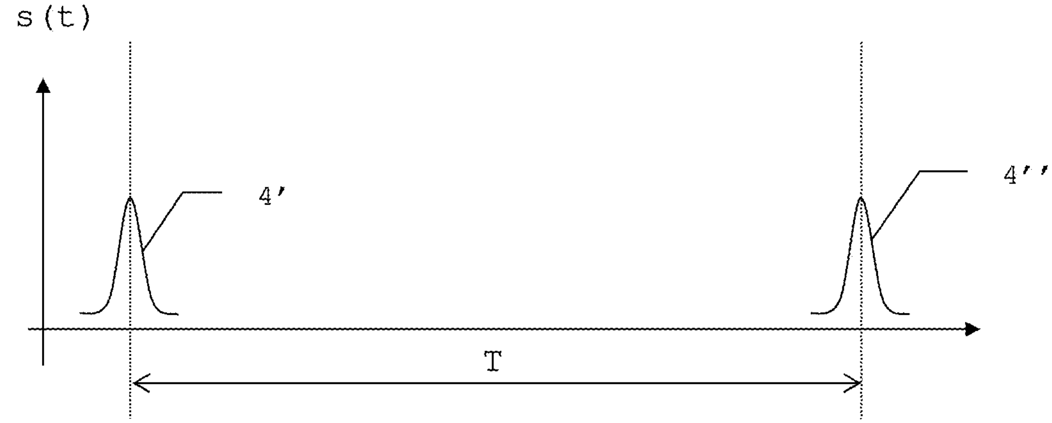
FIG. 2*b* shows a schematic illustration of a runtime measurement method according to the prior art.

As explained in FIG. 2*b* in a schematic illustration, the distance is ascertained from the propagation delay T as the chronological difference between the starting point in time of the emission of a light pulse 4', which is for example given by a clock or trigger or is computed, and the receiving point in time of the backscattered light pulse 4", i.e. the time delay. The ascertainment of the receiving point in time is performed in this case by the evaluation of the signal pulse s(t), for example, exceeding a signal threshold.

Figures 3A, 3B, 4A, 4B, 5:
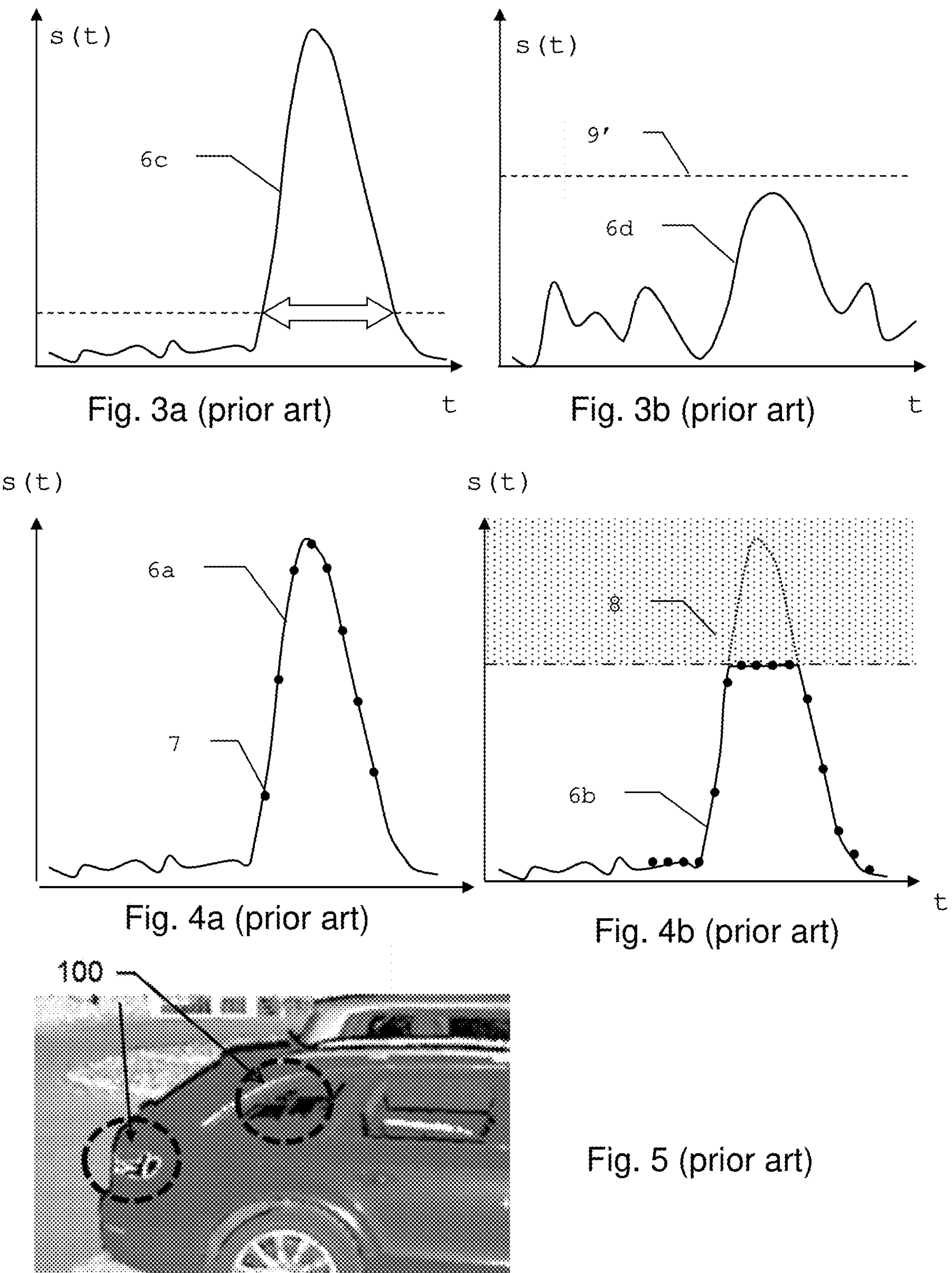
FIG. 3*a* shows a schematic illustration of a threshold value method for backscattered light signals according to the prior art.
FIG. 3*b* shows a schematic illustration of the threshold problem of the threshold value method.
FIG. 4*a* shows a schematic illustration of a sampling method for backscattered light signals according to the prior art.
FIG. 4*b* shows a schematic illustration of the saturation problem of the sampling method.
FIG. 5 shows an example of a measurement result with a distance meter according to the prior art.

In FIG. 3*a*, a threshold value method for backscattered light signals 6*c* according to the prior art is explained. To suppress noise, background components, or systematic interfering signals, for example, due to the optical and electrical crosstalk between transmitter signal path and receiver signal path, and exclude them from a detection, a detection threshold 9 (for example, in the form of a comparator component) is used.

Signal intensities s(t) located below this detection threshold 9 do not result in a response of the comparator, which generates a stop signal, as the discriminator and therefore do not result in a detection. If the signal 6*c* exceeds the detection threshold 9 in its intensity, the detection occurs and therefore the generation of the stop signal and the registration of the receiving point in time.

The output signal provided by the threshold value method is therefore dependent on the received or input signal reaching or exceeding the detection threshold 9. However, if the signal intensity s(t) always remains below a detection threshold 9', as shown in the example of FIG. 3*b*, no response of the discriminator (comparator) thus occurs and the signal 6*d* is not detected.

This threshold problem of the threshold value method occurs, for example, in the case of large measurement distances or corresponding background influences, which can drive the required threshold level of the threshold signal downward. This is also the case with a proportional discriminator (constant fraction discriminator), in which the trigger threshold is varied proportionally to the maximum amplitude. In the event of small signals, the trigger threshold cannot be sufficiently reduced, since otherwise random noise would trigger receiving time marks.

The simple threshold value method typically allows lower distance determination accuracies than the sampling method (WFD principle) mentioned hereafter, at least if the received pulse is not located in the saturation of the detector.

FIG. 4*a* illustrates the principle of a sampling method (WFD) for backscattered light signals according to the prior art. A received signal 6*a* is sampled at various points in time 7 and/or assigned time intervals, so that the signal shape may be derived. To also be able to detect large variations of the signal pulse s(t), a high dynamic response is required on the receiver side, which enables the complete acquisition or sampling of the signal 6*a*.

Otherwise, the situation shown in FIG. 4*b* can occur, if parts of the signal 6*b* are outside the dynamic range and saturation problems of the sampling method occur. Above a saturation limit, a saturated range 8 of the receiver exists, in which no usable sampling values of the pulse are available resp. signal interpolation is impossible, in particular for the complete pulse. The use of the sampled values for the determination of the chronological location of the pulse is then restricted to the range located below the saturation limit. Signal interpolation is not possible for even a larger range. A determination of the signal shape and location is then difficult or impossible, in particular in the case of a high slew rate or pulse distortions due to saturation effects of the receiver electronics which can comprise the TIA, amplifier or ADC, resulting in poor distance measurement accuracy or measurement results as shown in following FIG. 5.

FIG. 5 shows a measurement result of a scan with a laser scanner as shown in FIG. 1 with an electro-optic distance meter of the prior art. As can be seen, highly reflective objects surfaces 100 such as window or signal lights lead to strong received light pulse, resulting in said saturation of the receiver. No evaluable digital signal is provided and thus no valid distance can be determined, leading to measurement gaps (the black regions marked by the circles).

Figure 6:
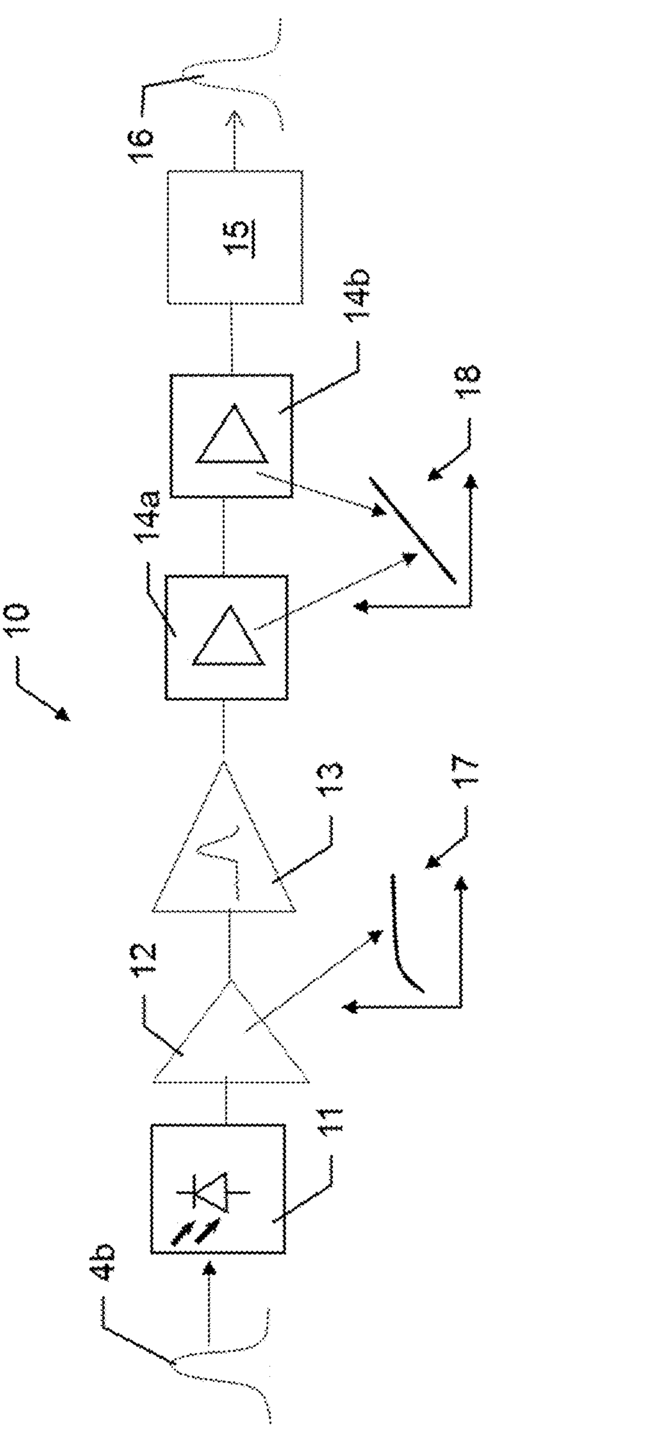
FIG. 6 shows a schematic example of a receiver chain of a distance meter.

FIG. 6 shows an example of a receiver chain 10. A received light pulse 4*b* is detected by a photodetector 11. The detector's output is transmitted to a transimpedance amplifier (TIA) 12, which in the example is a first member of an amplifier chain. As an alternative to a TIA, a current mode electronics can be used as a (first) gain stage. The signal amplified and converted by the TIA 12 is filtered by a bandpass or lowpass filter 13. The filter 13 is a low pass filter and reduces the bandwidth to the Nyquist frequency. Filtering serves in particular for having a number of sampling points sufficient for precise sampling in the rising resp. falling edge of the light pulse 4*b* and facilitate signal interpolation.

In the example, the filtered signal is transferred to one or multiple further gain stages 14*a*, 14*b*, for example gain buffers, which further amplify the analog signal and/or compensate for filtering attenuation. A further gain stage 14*a*, 14*b* may also serve for adapting the signal level to the following analog-digital-converter (ADC) 15. However, in another embodiment, alternatively to the exemplary configuration shown, the ADC 15 may be fed directly by the filter 13, without any further gain stage beside TIA 12. Finally, the ADC outputs a digital signal 16.

The photodetector 11, the first gain stage (e.g. TIA) 12, the gain stages 14*a*, 14*b* and the ADC 15 are adapted to each other in such a way that in any case the further gain stages 14*a,b* and the ADC 15 remain in linear operation 18. That is, even for strong light pulses 4*b*, only the photodetector 11 and/or TIA 12 may respond in a non-linear way or may saturate whereas all gain stages 14*a*, 14*b* respond linearly.

Said otherwise, the TIA 12—and if necessary the photodetector 11, too—serves so to say as a signal buffer which absorbs overload by received light pulse 4*b* such that high signal strengths of received light pulses 4*b* nevertheless can be treated by any further gain stage 14*a,b* in its linear operation range.

This particular configuration of the receiver chain 10 allows for a high dynamic range of the distance meter with only one receiver chain 10/hardware channel, whilst showing only limited and distinct/controllable signal distortion. That is, the characteristic properties of the light pulse 4*b* are preserved resp. can be still identified/read out. In particular, pulse width correlates even for intense pulses 4*b* with intensity. As a further advantage, range walk correction is enabled. Further, the signal remains continuous, without any unsteady regions which otherwise would impede determination of time delay.

The inventive distance meter resp. receiver chain 10 gives out a digital signal 16 which provides an unambiguous relationship between signal intensity and time delay of the received light pulse 4*b* as well as between (digital) signal shape and time delay of digital signal 16. Hence, even for strong light pulses 4*b* out of the linear operation range or for saturation of the receiver chain 10 or with "deformed" digital signals 16 (a digital signal 16 not fulfilling certain conditions as described above in context of FIGS. 3*a,b* and 4*a,b*), a time delay can be determined unambiguously and accurately.

Figure 7:
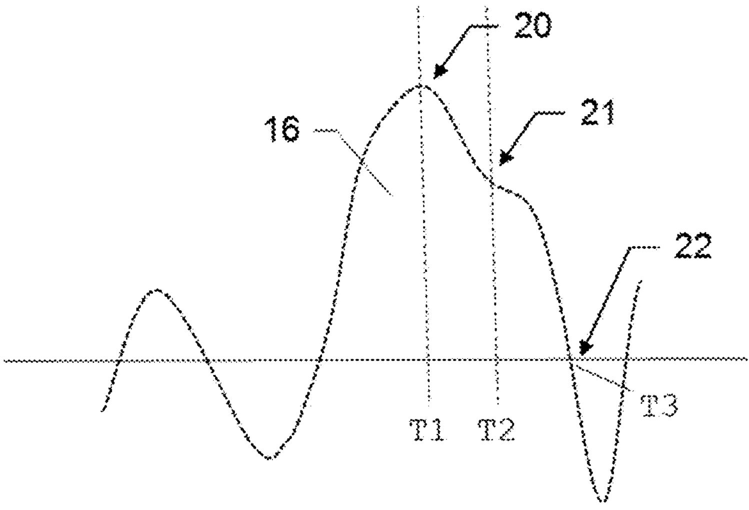
FIG. 7 shows a schematic example of a digital signal processing for time delay determination.

FIG. 7 shows a schematic example of a digital signal 16 outputted by the receiver chain, the signal 16 representing a received pulse of high intensity, with non-linear time-invariant response of the TIA. The digital signal is processed for time delay determination by extracting characteristic signal features, for example as depicted a maximum 20, a turning point or point of inflection 21 or a zero-crossing 22. Other examples of signal features are generic pulse features according to a well-defined and limited number/types of pulse shapes. Each characteristic feature 20, 21, 22 is tagged with a time stamp T1, T2, T3, wherefore signal interpolation is applied. Then, the time delay searched for is determined based on one or more of these time stamps T1, T2, T3, either directly by using the time stamps as such—or indirectly by using signal features such as amplitude or phase at the respective time stamp.

Characteristic features 20-22 can also be used to determine not only time delay but other properties of the received light pulse. In particular, a pulse intensity is determined based on one or more characteristic signal features 20-22.

Optionally, digital linear operators are applied to the digital signal 16 as part of its processing before extracting a feature 20, 21, 22. An example is given with respect to FIG. 9 below.

Thereby, a characteristic feature of digital signal 16 can be a zero-crossing of an m-th order derivative of the digital signal 16 or of an output of digital linear operators (e.g. constant fraction discriminators), whereby in particular m is 0, 1 or 2.

In specific embodiments, the digital processing comprises a range walk correction, whereby a pulse position in time is estimated by a first weighted sum of time stamps T1 (or signal information such as amplitude associated therewith or allocated thereto) of extracted characteristic signal features 20-22 with an additive correction based on a lookup against a second weighted sum of time stamps Tj (or signal information associated therewith) of extracted characteristic signal features 20-22.

In particular if pulse width is rising monotonously with intensity and if only two extracted characteristic features 20, 21 are considered, range walk correction can be based on a difference of time stamps T1, T2. Thereby, the characteristic features can be of the same type resp. same order m, i.e. for example two extreme values 20 or two turning points 21, or can be of different type.

Figure 8:
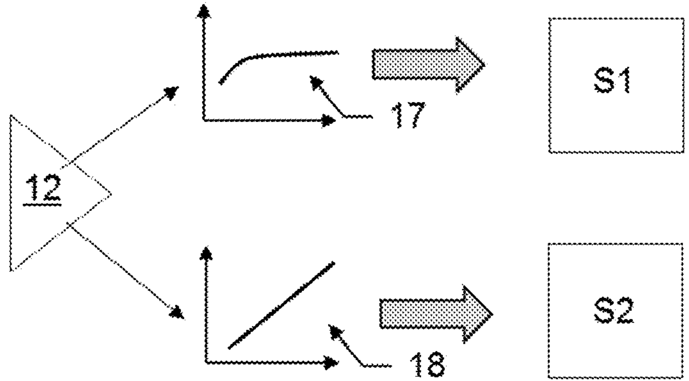
FIG. 8 shows a schematic example of differentiating digital signal processing and FIG. 9 a schematic example of applying a digital linear operator to the digital signal.

FIG. 8 shows a schematic illustration for providing different digital signal processing S1, S2. An electronic processor of the distance meter is configured to read out from the digital signal (16 in FIG. 6) if the TIA 12 is in linear operation range 18 or if it is in said non-linear time-invariant or well-defined time-invariant saturation behavior 18. For making said distinction, for example a gradient of a rising and/or a falling edge, a peak level and/or a width of digital signal 16 or one or more extracted characteristic features as described above (particular in context of FIG. 7) is considered, for instance in comparison or association to stored reference values.

As a result of this analysis, two different ways of signal processing are applied, a first digital processing S1 for the non-linear/saturation mode 17 and a second digital processing S2 for the linear mode 18. The second digital processing S2 comprises for example a standard determination of time delay as known in the art as it is applied in particular for pulses within low or medium dynamics (see FIG. 4*a*).

Figure 9:
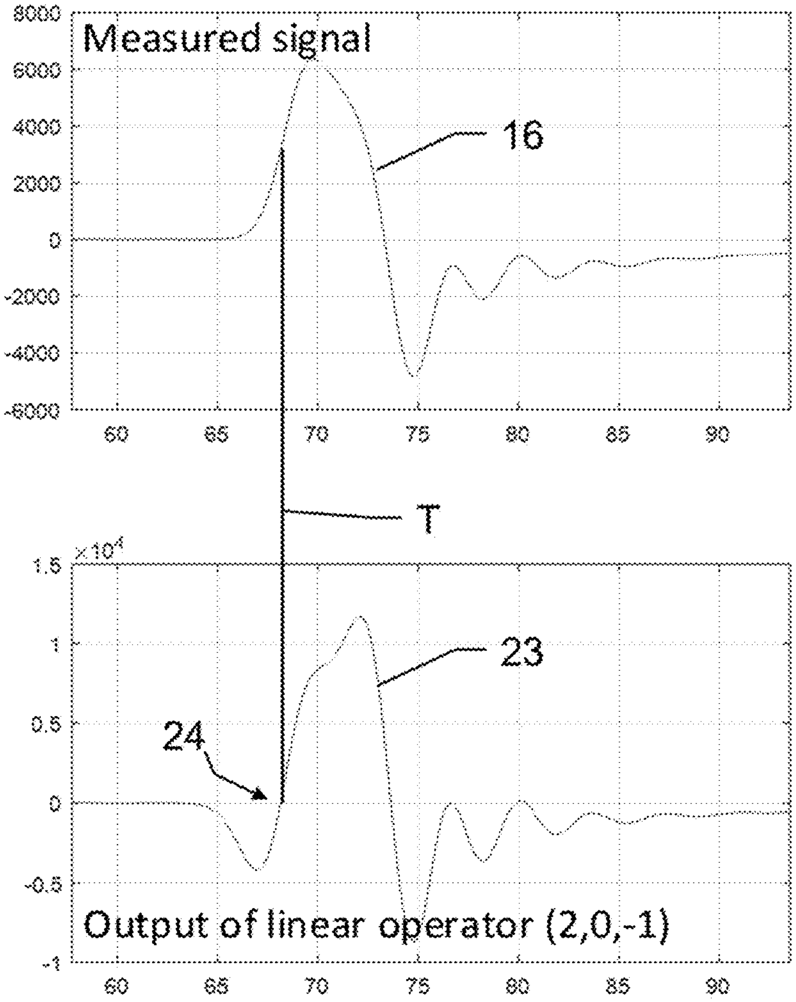

FIG. 9 shows an example of a digital linear operator applied to the digital signal 16 as already mentioned above. Such digital linear operators are applied to the digital signal 16 before extracting said characteristic signal features. Such a linear operator for example approximates first order derivatives. Or it mimics or emulates constant fraction discriminators as in the present example, which depicts in the upper the digital signal 16 and in the lower the output 23 of the digital operator applied to the signal 16. The digital operator digitally approximates a classic analog constant fraction discriminator (CPU) e.g. by subtracting a pulse's signal delayed by an amount from a fraction of the original signal and then computing the resultant signal's first zero crossing 24 to digitally estimate the pulse's time of arrival T.

The illustrated figures only schematically illustrate possible example embodiments. The various approaches can also be combined with one another and with methods of the prior art.

The invention claimed is:

1. An electro-optic distance meter according to the time-of-flight principle with a receiver chain for generating a digital signal from a received light pulse and an electronic processor for digital signal processing of the digital signal, wherein the digital signal processing comprises waveform digitization, signal reconstruction from sample point values and determination of a time delay of the received light pulse, the receiver chain comprising in succession:

a photodetector a gain stage for converting an input current from the photodetector associated to the received light pulse into an analog output, a band or low pass filter and as at least one receiver chain element following the filter an analog-to-digital converter for providing a digital signal, wherein the digital signal provides an unambiguous relationship of optical intensity and time delay to electrical signal shape and time delay, wherefore the photodetector, the gain stage and the analog-to-digital converter are adapted to each other such that any receiver chain element following the filter, therein the analog-to-digital converter, remain unclipped in its linear operating range even when the gain stage shows a non-linear time-invariant response or a well-defined time-invariant saturation response, wherein the electronic processor is configured to provide a distinction as to whether the gain stage shows either said non-linear time-invariant/well-defined time-invariant saturation response, or whether it is in its linear operation range based on the digital signal, and to provide an adaption of the signal processing in accordance thereto.

2. The electro-optic distance meter according to claim 1, wherein the digital signal processing comprises:

extracting at least one characteristic signal feature, tagging the extracted feature with a time stamp by means of signal interpolation and determining the time delay of the received light pulse directly or indirectly based on the according time stamps.

3. The electro-optic distance meter according to claim 2, wherein the digital signal processing comprises applying digital linear operators to the digital signal before extracting a characteristic signal feature.

4. The electro-optic distance meter according to claim 3, wherein the digital linear operators mimic constant fraction discriminators and/or approximate first order derivatives.

5. The electro-optic distance meter according to claim 3, wherein the digital linear operators are configured to eliminate signal offsets.

6. The electro-optic distance meter according to claim 2, wherein the characteristic feature is a zero-crossing of an m-th order derivative of the digital signal.

7. The electro-optic distance meter according to claim 6, wherein m is 0, 1 or 2.

8. The electro-optic distance meter according to claim 3, wherein the characteristic feature is a zero-crossing of an m-th order derivative of an output of said digital linear operators.

9. The electro-optic distance meter according to claim 2, wherein the digital processing comprises range walk correction by applying an additive correction to an estimation of a pulse position by a first weighted sum directly or indirectly based on said time stamps of extracted characteristic signal features, whereby the additive correction is based on a second weighted sum directly or indirectly based on said time stamps.

10. The electro-optic distance meter according to claim 2, wherein the digital processing comprises range walk correction based on a difference of time stamps of two extracted characteristic features.

11. The electro-optic distance meter according to claim 2, wherein the digital signal processing comprises determining a pulse intensity based on the at least one characteristic signal feature.

12. The electro-optic distance meter according to claim 1, wherein the signal reconstruction is based on signal interpolation.

13. The electro-optic distance meter according to claim 1, wherein the filter is designed for limiting the signal bandwidth to the Nyquist frequency.

14. The electro-optic distance meter according to claim 1, wherein the distinction is based on a comparison of said signal characteristic with a defined threshold.

15. A method for electro-optic distance measuring wherein the distance is measured with an electro-optic distance meter according to claim 1.

16. The electro-optic distance meter according to claim 1, wherein the gain stage comprises a transimpedance amplifier or a current-mode electronic.

17. The electro-optic distance meter according to claim 2, wherein the distinction is based on the at least one extracted characteristic signal feature.

18. The electro-optic distance meter according to claim 8, wherein m is 0, 1 or 2.

* * * * *